(12) United States Patent
Han et al.

(10) Patent No.: US 10,011,750 B2
(45) Date of Patent: Jul. 3, 2018

(54) HIGHLY ELASTIC AQUEOUS ADHESIVE COMPOSITION AND METHOD OF SURFACE-TREATING MOLDED ARTICLE USING THE SAME

(71) Applicants: Hyundai Motor Company, Seoul (KR); Kia Motors Corporation, Seoul (KR); Noroobee Chemical Co., Ltd., Cheonan, Chungcheongnam-do (KR)

(72) Inventors: In Soo Han, Gyeonggi-do (KR); Myoung Ryoul Lee, Seoul (KR); Doo Soo Kim, Gyeonggi-do (KR); Seung Pyo Hong, Daegu (KR); Yong Chul Lee, Chungcheongnam-do (KR); Ji Yeon Jung, Gyeonggi-do (KR); Jae Beom Ahn, Gyeonggi-do (KR)

(73) Assignees: Hyundai Motor Company, Seoul (KR); Kia Motors Corporation, Seoul (KR); Norooobee Chemical Co., Ltd., Cheonan, Chungcheongnam-Do (KR)

( * ) Notice: Subject to any disclaimer, the term of this patent is extended or adjusted under 35 U.S.C. 154(b) by 0 days.

(21) Appl. No.: 14/983,836

(22) Filed: Dec. 30, 2015

(65) Prior Publication Data
US 2016/0369140 A1 Dec. 22, 2016

(30) Foreign Application Priority Data
Jun. 16, 2015 (KR) .................. 10-2015-0084855

(51) Int. Cl.
| | | |
|---|---|---|
| C09J 175/06 | (2006.01) | |
| B29C 65/48 | (2006.01) | |
| B29C 65/00 | (2006.01) | |
| C08G 18/75 | (2006.01) | |
| C08G 18/79 | (2006.01) | |
| C08G 18/08 | (2006.01) | |
| C08G 18/24 | (2006.01) | |
| C08G 18/34 | (2006.01) | |
| C08G 18/42 | (2006.01) | |
| B29L 31/58 | (2006.01) | |
| B29K 75/00 | (2006.01) | |

(52) U.S. Cl.
CPC .......... *C09J 175/06* (2013.01); *B29C 65/483* (2013.01); *B29C 66/729* (2013.01); *C08G 18/0823* (2013.01); *C08G 18/246* (2013.01); *C08G 18/348* (2013.01); *C08G 18/42* (2013.01); *C08G 18/755* (2013.01); *C08G 18/792* (2013.01); *B29K 2075/00* (2013.01); *B29L 2031/58* (2013.01); *C08G 2170/80* (2013.01)

(58) Field of Classification Search
USPC ........................................ 156/327
See application file for complete search history.

(56) References Cited

U.S. PATENT DOCUMENTS

| | | | |
|---|---|---|---|
| 6,566,444 B1 | 5/2003 | Gobel et al. | |
| 2002/0040094 A1* | 4/2002 | Takahashi | C08F 283/06 524/590 |
| 2005/0209399 A1* | 9/2005 | Munzmay | C08G 18/0828 524/589 |
| 2006/0079635 A1* | 4/2006 | Pohl | C08G 18/0819 524/589 |
| 2011/0306724 A1* | 12/2011 | Campbell | C08G 18/0823 524/591 |
| 2012/0276296 A1 | 11/2012 | Fieberg et al. | |
| 2014/0194571 A1* | 7/2014 | Weijnen | C08G 18/6651 524/778 |

FOREIGN PATENT DOCUMENTS

| | | |
|---|---|---|
| JP | 2013-087122 A | 5/2013 |
| KR | 10-0217448 B1 | 9/1999 |
| KR | 10-0474230 B1 | 3/2005 |
| KR | 10-0498573 B1 | 6/2005 |
| KR | 2006-0052176 A | 5/2006 |
| KR | 2011-0068909 A | 6/2011 |
| KR | 10-1161893 B1 | 7/2012 |
| KR | 10-2013-0063625 A | 6/2013 |
| KR | 10-2015-0011505 A | 2/2015 |
| KR | 10-2015-0062499 A | 6/2015 |

OTHER PUBLICATIONS

Machine Translation of KR 10-2013-0063625.*

* cited by examiner

*Primary Examiner* — Michael M Dollinger
(74) *Attorney, Agent, or Firm* — Mintz Levin Cohn Ferris Glovsky and Popeo, P.C.; Peter F. Corless

(57) ABSTRACT

Disclosed are a adhesive composition and a method of surface-treating a molded article using the same. In particular, the adhesive composition may be eco-friendly because smell and VOC generation from the organic solvent are reduced by adding a water-dilutable polyurethane resin having a hydroxyl group to a waterborne polyurethane resin, thereby improving properties such as elastic recoverability and scratch resistance while satisfying conventional properties.

12 Claims, No Drawings

HIGHLY ELASTIC AQUEOUS ADHESIVE COMPOSITION AND METHOD OF SURFACE-TREATING MOLDED ARTICLE USING THE SAME

CROSS-REFERENCE TO RELATED APPLICATION

This application claims under 35 U.S.C. § 119(a) the benefit of priority to Korean Patent Application No. 10-2015-0084855 filed on Jun. 16, 2015, the entire contents of which are incorporated herein by reference.

BACKGROUND (a) Technical Field

The present invention relates to an aqueous adhesive composition and a method of surface-treating a molded article using the same. Particularly, the adhesive composition may be a highly elastic aqueous adhesive composition, which may be eco-friendly by reducing of smell and VOC generation generated from an organic solvent. The adhesive composition may be prepared by steps comprising adding a water-dilutable polyurethane resin having a hydroxyl group to a waterborne polyurethane resin, thereby improving properties such as elastic recoverability and scratch resistance while satisfying conventional properties, and a method of surface-treating a molded article using the same.

(b) Background Art

A hard feeling of conventional vehicle interior plastic component surfaces has reduced value and does not properly satisfy consumers pursuing high-end products. Accordingly, in order to enhance emotional quality or texture of vehicle interior materials, outer sides of injection-molded articles have been covered with a variety of fabrics to enhance warm feeling. For example, surface treatment has been carried out by a method wherein workers tightly pull fabric such that injection-molded articles are covered, after spreading oil-based adhesive on outer sides of injection-molded articles.

However, in this case, cost burden may be high due to use of expensive fabric (e.g. suede), volatile organic compounds (VOCs) generated from an organic solvent contained in an oil-based adhesive may induce environmental pollution, and worker's health may be damaged due to strong smell.

In order to address such problems, vehicle companies have provided a VOC emission amount of a minimum requirement standard, and restriction may be reinforced by various environment-related regulations in South Korea and in other countries in the world.

In addition, waterborne polyurethane may be used as a water-based adhesive to enhance an oil-based adhesive. Waterborne polyurethane solubilizes both terminals thereof using isocyanate, a prepolymer having a urea group at both terminals thereof using polyvalent amine as a chain extender may be prepared through dispersion in water. However, reproduction and molecular weight control, upon dispersion, of waterborne polyurethane obtained according to the method may be difficult. Particularly, when the waterborne polyurethane is used as an adhesive, a film becomes soft, after curing, due to lack of a functional group that may induce curing reaction, thus film properties such as weather resistance, wear resistance, etc. may be negatively affected. Accordingly, use of the waterborne polyurethane as a water-soluble top coat (clear) for vehicles may not be desirable. In addition, the waterborne polyurethane has disadvantages such as difficult painting workability due to a large molecular weight and very hard characteristics.

In the related arts, Korean Patent No. 1161893 discloses an aqueous dispersion including a polyester-polyurethane resin dispersion and a hydroxy-functional aqueous or water-dilutable binder. However, a water dispersion process may be additionally performed.

In addition, Korean Patent No. 217448 discloses an aqueous solution or an aqueous dispersion of a water-dilutable organic polyol ingredient containing a mixture of a hydroxy-functional polymer and an aqueous binder composition containing a polyisocyanate ingredient. However, there is a disadvantage wherein the content of organic solvent in an aqueous dispersion may increase.

In addition, Korean Patent Application Pub. No. 2006-0052176 discloses an aqueous foam coating composition including an aqueous polyurethane-polyurea dispersion, a hydroxy-functional aqueous or water-dilutable binder, polyisocyanate, a foam and a stabilizer. However, a foaming process may be additionally performed and wear of a foam may be decreased.

Therefore, there is a need for development of a novel adhesive which may prevent environment pollution by decreasing use of an organic solvent and enhance properties such as texture, wear resistance, scratch resistance, etc., and a method of surface-treating a molded article using the same.

The above information disclosed in this Background section is only for enhancement of understanding the background of the invention and therefore it may contain information that does not form the prior art that is already known in this country to a person of ordinary skill in the art.

SUMMARY OF THE INVENTION

The present invention has been made in an effort to solve the above-described problems associated with prior art.

In preferred aspects, the present invention may provide an eco-friendly adhesive composition, by reducing smell and VOC generation from an organic solvent and may enhance properties such as elastic recoverability and scratch resistance while satisfying conventional properties. In addition, the production costs may be decreased, and suede texture, which is eco-friendly and has superior elastic recoverability and scratch resistance and has soft sense, may be obtained. The suede texture may be provided to a molded article by surface-treating, for example, by steps comprising applying an adhesive composition to a molded article and applying yarn pile to the molded article.

The term "yarn pile" or "pile", as used herein, refers to a fabric or textile having embossed or upraised surface or nap. The pile may not be particularly limited to materials of the fabrics.

In one aspect, provided is an adhesive composition which may enhance elastic recoverability and scratch resistance while satisfying conventional properties.

In another aspect, provided is a method of surface-treating a molded plastic article for vehicle interior materials, thereby providing suede texture having soft sense to the molded produce whereas cutting production costs.

In one preferred aspect, the adhesive composition may comprise: an amount of about 10 to 30% by weight of a water-dilutable polyurethane resin having a hydroxyl group; an amount of about 20 to 40% by weight of a waterborne polyurethane resin; an amount of about 5 to 20% by weight of a hardener; an amount of about 3 to 10% by weight of an extender pigment; an amount of about 0.1 to 5.0% by weight of a wetting agent; an amount of about 0.1 to 3.0% by weight of a slip agent; an amount of about 0.1 to 2.0% by weight of an antifoaming agent; an amount of about 0.01 to 2.00% by weight of a hardening accelerator; an amount of about 0.5 to 5.0% by weight of a light stabilizer; an amount of about 0.1 to 3.0% by weight of a thickener; and an amount of about 20 to 40% by weight of a solvent, the % by weight based on the total weight of the adhesive composition.

Preferably, the water-dilutable polyurethane resin having a hydroxyl group may comprise: a) isocyanate having two or more functional groups on average; b) hydrophilic polyol having two or more functional groups on average; c) polyester polyol; d) a solvent; and e) a neutralizing agent.

Preferably, the water-dilutable polyurethane resin having a hydroxyl group may comprise: a) an amount of about 1 to 10% by weight of the isocyanate having two or more functional groups on average; b) an amount of about 1 to 10% by weight of the hydrophilic polyol having two or more functional groups on average; c) an amount of about 55 to 80% by weight of the polyester polyol; d) an amount of about 5 to 20% by weight of the solvent; and e) an amount of about 1 to 5% by weight of the neutralizing agent, all the % by weight based on the total weight of the water-dilutable polyurethane resin having a hydroxyl group.

Preferably, the isocyanate having two or more functional groups on average may be one or more selected from the group consisting of toluene diisocyanate, 4,4-diphenylmethane diisocyanate, hexamethylene diisocyanate, isophorone diisocyanate, dicyclohexylmethane diisocyanate and multifunctional isocyanate derived therefrom.

Preferably, the hydrophilic polyol having two or more functional groups on average may be one or more selected from the group consisting of dimethylpropionic acid, dimethylbutanoic acid, polyoxyethylene glycol, polycaprolactone diol comprising a carboxyl group in a side chain thereof, polyether diol comprising a sulfonic acid group in a side chain thereof, and polyol comprising a polyoxyethylene group substituted with an alkoxy group in a side chain thereof.

Preferably, a weight-average molecular weight (Mw) of the polyester polyol may be of about 500 to 5000.

Preferably, the solvent may be one or more selected from the group consisting of N-methylpyrrolidone, acetone, methylethylketone, dimethylformamide, glycoletherester and hydrogenated furan.

Preferably, the neutralizing agent may be N-methyldiethanolamine, triethanolamine or a mixture thereof.

Preferably, the waterborne polyurethane resin comprises one or more polyols selected from the group consisting of polyacrylic polyol, polyester polyol and polycarbonate polyol.

Further, provided is the adhesive composition that may consist of, consist essentially of, or essentially consist of the above components as described herein. For instance, The adhesive composition of the invention may consist essentially of: an amount of about 10 to 30% by weight of a water-dilutable polyurethane resin having a hydroxyl group; an amount of about 20 to 40% by weight of a waterborne polyurethane resin; an amount of about 5 to 20% by weight of a hardener; an amount of about 3 to 10% by weight of an extender pigment; an amount of about 0.1 to 5.0% by weight of a wetting agent; an amount of about 0.1 to 3.0% by weight of a slip agent; an amount of about 0.1 to 2.0% by weight of an antifoaming agent; an amount of about 0.01 to 2.00% by weight of a hardening accelerator; an amount of about 0.5 to 5.0% by weight of a light stabilizer; an amount of about 0.1 to 3.0% by weight of a thickener; and an amount of about 20 to 40% by weight of a solvent, the % by weight based on the total weight of the adhesive composition. In particular, the water-dilutable polyurethane resin having a hydroxyl group may consist essentially of: a) an amount of about 1 to 10% by weight of the isocyanate having two or more functional groups on average; b) an amount of about 1 to 10% by weight of the hydrophilic polyol having two or more functional groups on average; c) an amount of about 55 to 80% by weight of the polyester polyol; d) an amount of about 5 to 20% by weight of the solvent; and e) an amount of about 1 to 5% by weight of the neutralizing agent, all the % by weight based on the total weight of the water-dilutable polyurethane resin having a hydroxyl group.

In one preferred aspect, the present invention provides a method of surface-treating a molded plastic article for vehicle interior materials. In an exemplary embodiment, the method may comprise: applying the adhesive composition as described herein to a molded plastic article, and applying pile to the molded plastic article.

Other aspects and preferred embodiments of the invention are discussed infra.

DETAILED DESCRIPTION

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An adhesive composition may comprise: (1) an amount of about 10 to 30% by weight of a water-dilutable polyurethane resin having a hydroxyl group, (2) an amount of about 20 to 40% by weight of a waterborne polyurethane resin, (3) an amount of about 5 to 20% by weight of a hardener, (4) an amount of about 3 to 10% by weight of an extender pigment, (5) an amount of about 0.1 to 5.0% by weight of a wetting agent, (6) an amount of about 0.1 to 3.0% by weight of a slip agent, (7) an amount of about 0.1 to 2.0% by weight of an antifoaming agent, (8) an amount of about 0.01 to 2.00% by weight of a hardening accelerator, (9) an amount of about 0.5 to 5.0% by weight of a light stabilizer, (10) an amount of about 0.1 to 3.0% by weight of a thickener and (11) an amount of about 0 to 40% by weight of a solvent, all the % by weight are based on the total weight of the adhesive composition.

Thus, the adhesive composition according to a preferred embodiment of the present invention may be eco-friendly due to reduced amount of smell and VOC generation from an organic solvent by adding water-dilutable polyurethane resin having a hydroxyl group to a waterborne polyurethane resin and may enhance properties such as elastic recoverability and scratch resistance while satisfying conventional properties.

The highly elastic aqueous adhesive composition may include ingredients as follows.

(1) Water-Dilutable Polyurethane Resin Having Hydroxyl Group

The water-dilutable polyurethane resinhaving a hydroxyl group, as used herein, may include a) isocyanate having two or more functional groups on average, b) hydrophilic polyol having two or more functional groups on average, c) polyester polyol, d) a solvent and e) a neutralizing agent.

The term "water-dilutable", as used herein, refers to be capable of diluted spontaneously, or being suitable to be diluted in water, without use of other chemical agent or physical action.

In particular, the water-dilutable polyurethane resin having a hydroxyl group may be prepared, without using a chain extender such as polyvalent amine, from the polyurethane prepolymer. For example, the polyurethane prepolymer may be used by adjusting an OH/NCO equivalent ratio (hydrophilic polyol to isocyanate) thereof to be from about 0.5 to about 0.6:1, such that the content of hydroxyl group may be from about 10 to about 80 mgKOH/g.

Further, the amount of NCO may be suitably reduced for residue of the hydroxyl group. When a remaining hydroxyl group is applied to an adhesive, the remaining hydroxyl group may cure-react with waterborne polyisocyanate, and thus, adhesive properties such as weather resistance and wear resistance may be greatly enhanced. Accordingly, the water-dilutable polyurethane resin including a hydroxyl group may be diluted in water without dispersion and thus a solid content (NV: Non-Volatile) may be easily controlled.

Further, when the content of the water-dilutable polyurethane resin having a hydroxyl group is less than about 10% by weight, sufficient properties may not be obtained, for example, texture may be stiffened, and scratch resistance may be decreased. When the content of the water-dilutable polyurethane resin having a hydroxyl group is greater than about 30% by weight, texture may be enhanced, however, a sticky feeling may be increased after drying an adhesive and wear properties may be decreased.

The water-dilutable polyurethane resin having a hydroxyl group may particularly include a) an amount of about 1 to 10% by weight of the isocyanate having two or more functional groups on average, b) an amount of about 1 to 10% by weight of the hydrophilic polyol having two or more functional groups on average, c) an amount of about 55 to 80% by weight of the polyester polyol, d) an amount of about 5 to 20% by weight of the solvent and e) an amount of about 1 to 5% by weight of the neutralizing agent, based on the total weight of the water-dilutable polyurethane resin having a hydroxyl group.

Preferably, the isocyanate having two or more functional groups on average may be one or more selected from the group consisting of toluene diisocyanate, 4,4-diphenylmethane diisocyanate, hexamethylene diisocyanate, isophorone diisocyanate, dicyclohexylmethane diisocyanate and multifunctional isocyanate derived therefrom. More preferably, the isocyanate having two or more functional groups on average may be isophorone diisocyanate, dicyclohexylmethane diisocyanate or a mixture thereof. The isocyanate may be used in an amount of about 1 to 10% by weight based on the total weight of the water-dilutable polyurethane resin having a hydroxyl group. In particular, when the content of the isocyanate is less than about 1% by weight, mechanical properties and chemical resistance may be decreased. When the content of the isocyanate is greater than about 10% by weight, viscosity increases and thus a synthesis process may become difficult. Therefore, the isocyanate may be used within the range.

Preferably, the hydrophilic polyol having two or more functional groups on average may be one or more selected from the group consisting of dimethylpropionic acid, dimethylbutanoic acid, polyoxyethylene glycol, polycaprolactone diol including a carboxyl group in a side chain thereof, polyether diol including a sulfonic acid group in a side chain thereof and polyol including a polyoxyethylene group substituted with an alkoxy group in a side chain thereof. The hydrophilic polyol may be used in an amount of about 1 to 10% by weight based on the total weight of the water-dilutable polyurethane resin including a hydroxyl group. In particular, when the content of the hydrophilic polyol is less than about 1% by weight, water dispersion might not be possible due to lack of hydrophilicity. When the content of the hydrophilic polyol is greater than about 10% by weight, water resistance may be decreased. Therefore, the hydrophilic polyol may be used within the range.

Preferably, the polyester polyol that is used to prepare the polyurethane resin may be prepared by condensation of an alcohol compound and an acid. In particular, the polyester polyol may be prepared by condensation of an alcohol compound of polyester or methylpropanediol having a weight-average molecular weight (Mw) of about 500 to 5,000 and an acid such as adipic acid or isophthalic acid, using diethylene glycol and adipic acid as matrices. Accordingly, as the polyester polyol, a polyester polyol having a weight-average molecular weight (Mw) of about 500 to 5000 may be used. In particular, when the weight-average molecular weight is outside the range, chemical resistance and productivity may be decreased.

The solvent may be a general solvent, preferably one or more selected from the group consisting of N-methylpyrrolidone, acetone, methylethylketone, dimethylformamide, glycoletherester and hydrogenated furan. The solvent may be used in an amount of about 5 to 20% by weight based on the total weight of the water-dilutable polyurethane resin having a hydroxyl group. In particular, when the amount of the solvent is outside the range, realization of desired properties may be difficult or drying time may be extended when used as an adhesive.

Preferably, the neutralizing agent may be N-methyldiethanolamine, triethanolamine or a mixture thereof, and particularly triethanolamine may be used. The neutralizing agent may be used in an amount of about 1 to 5% by weight. In particular, when the content of the neutralizing agent is less than about 1% by weight, neutralization effects are slight. When the content of the neutralizing agent is greater than about 5% by weight, problems such as smell and discoloration may occur. Therefore, the neutralizing agent may be used within the range.

(2) Waterborne Polyurethane Resin

The waterborne polyurethane resin, as used herein, may be synthesized through reaction of polyol and isocyanate. In particular, the waterborne polyurethane resin may include one or more polyols selected from the group consisting of polyacrylic polyol, polyester polyol and polycarbonate polyol. In addition, the waterborne polyurethane resin may have a pH of about 6 to 10, a tensile strength of about 5 to 35 mPa, and a fracture elongation of about 600 to 800%.

Preferably, the waterborne polyurethane resin may be used in an amount of about 20 to 40% by weight with respect to the highly elastic aqueous adhesive composition. In particular, when the content of the waterborne polyurethane resin is outside the range, adhesive properties may deteriorate.

(3) Hardener

The hardener, as used herein, may be added for curing of the adhesive composition. As the hardener, isophorone diisocyanate, hydrophilic hexamethylene diisocyanate or a mixture thereof having superior unfading and weather resistance properties may be used. In addition, the hardener may be used in an amount of about 5~20% by weight with respect to the adhesive composition. In particular, when the content of the hardener is less than about 5% by weight, an adhesive may not be cured and thus it is difficult to secure properties of a film. When the content of the hardener is greater than about 20% by weight, pot life may be decreased due to excess hardener, and thus, problems during working may occur.

(4) Extender Pigment

The extender pigment, as used herein, may be added to secure storability of an adhesive, for example by preventing sedimentation thereof, and to enhance tinting strength. Preferably, the extender pigment may be one or more selected from the group consisting of barium sulfate ($BaSo_4$), calcium carbonate ($CaCo_3$) and silica ($SiO_2$). In addition, the extender pigment may be used in an amount of about 3 to 10% by weight with respect to the adhesive composition. In particular, when the content of the extender pigment is less than about 3% by weight, sedimentation prevention effects may not be sufficiently obtained. When the content of the extender pigment is greater than about 10% by weight, the viscosity of an adhesive increases and thus workability may be dramatically decreased or properties may deteriorate.

(5) Wetting Agent

Wetting power of materials may be generally determined according to surface tension difference between an adhesive and a substrate. In general, surface tension of an adhesive should be lower than or, at least, the same as surface tension of a substrate. For example, when surface tension of an adhesive is greater than that of a substrate, an adhesive may not be easily spread or coated on a substrate. Accordingly, since aqueous adhesives containing much water generally have substantial surface tension, problems of wetting properties may often occur.

The wetting agent, as used herein, may enhance wetting properties of a material by greatly decreasing surface tension of an adhesive, prevent cratering, and provide a slip property to a surface. As the wetting agent, one or more wetting agents selected from the group consisting of polyether modified siloxane, polyether siloxane copolymer, polydimethyl siloxane and polyether modified polydimethylsiloxane may be used. In addition, the wetting agent may be used in an amount of about 0.1 to 5% by weight with respect to the adhesive composition. In particular, when the content of the wetting agent is less than about 0.1% by weight, a poor appearance problem may occur due to dust on a painted surface. When the content of the wetting agent is greater than about 5% by weight, a problem of decrease in adhesion may occur upon re-painting.

(6) Slip Agent

The slip agent, as used herein, may be added to enhance a slip property of a paint film surface and may be silicon. The slip agent may enhance scratch resistance and fouling resistance, permit easy cleaning, and enhance adhesive resistance. The slip agent may be used in an amount of about 0.1 to 3% by weight with respect to the adhesive composition. In particular, when the content of the slip agent is less than about 0.1% by weight, physical properties such as wear resistance and scratch resistance may be decreased. When the content of the slip agent is greater than about 3% by weight, an adhesive property may be decreased upon re-painting.

(7) Antifoaming Agent

When bubbles are generated during a production process, it may not be possible to contain an optimal amount of adhesive upon packing the adhesive, and a surface may become poor due to bubbles generated upon spreading of the adhesive. In addition, such bubbles may not have suitable appearance, and inherent properties of an adhesive performing protection function may be decreased. Accordingly, the antifoaming agent may be used to prevent bubble generation. The antifoaming agent may be a non-silicon-based antifoaming agent. The antifoaming agent may be used in an amount of about 0.1 to 2% by weight with respect to the adhesive composition. In particular, when the content of the antifoaming agent is less than about 0.1% by weight, antifoaming effects are insufficient. When the content of the antifoaming agent is greater than about 2% by weight, adhesive properties may be decreased upon re-painting.

(8) Hardening Accelerator

Preferably, the hardening accelerator may be one or more selected from the group consisting of trimethylenediamine, stannous octoate, dibutyltin dilaurate and 2-ethylhexosan plumbum. In addition, the hardening accelerator may be used in an amount of about 0.01 to 2.00% by weight with respect to the adhesive composition. In particular, when the content of the hardening accelerator is less than about 0.01% by weight, drying time may increase and physical properties such as chemical resistance, humidity resistance and wear resistance may be decreased. When the content of the hardening accelerator is greater than about 2% by weight, an adhesive may be too rapidly cured and thus, during spreading, popping may occur on an adhesive surface or an adhesive may be contracted.

(9) Light Stabilizer

The light stabilizer, as used herein, may be used to prevent aging, color change, etc. of a paint film which may be caused by long-term light exposure. In particular, the light stabilizer may perform functions such as ultraviolet blocking, light energy absorption and conversion, free-radical removal, etc. As the light stabilizer, a mixture of a UV absorber and a UV hindered amine light stabilizer as an organic amine-based compound having steric hindrance effects may be used. The UV absorber-based light stabilizer may be one or more selected from the group consisting of benzophenones, oxanilides, benzotriazoles and triazines. The organic amine-based light stabilizer may be 4-(benzoyloxy)-2,2,6,6-tetramethylpiperidine, 2,4-di-tert-butylphenyl-3,5-di-tert-butyl-4-hydroxybenzoate or a mixture thereof. Preferably, the UV absorber and the UV hindered amine light stabilizer may be mixed in a weight ratio of about 2:1. The light stabilizer may be used in an amount of about 0.5 to 5.0% by weight with respect to the adhesive composition. In particular, when the content of the light stabilizer is less than about 0.5% by weight, a paint film may be easily yellowed and gloss may be decreased over time. When the content of the light stabilizer is greater than about 5% by weight, storability of an adhesive may be poor.

(10) Thickener

Preferably, the thickener may be one or more selected from the group consisting of acrylics, urethane and ethylene vinyl acetate. In addition, the thickener composition may be used in an amount of about 0.1 to 3.0% by weight with respect to the adhesive. In particular, when the content of the thickener composition is less than about 0.1% by weight, an adhesive flows down upon painting and thus workability may be decreased. When the content of the thickener composition is greater than about 3% by weight, storability may be decreased and paint film appearance may be poor.

(11) Solvent

The solvent, as used herein, may be a general solvent, preferably one or more selected from the group consisting of N-methylpyrrolidone, acetone, methylethylketone, dimethylformamide, glycoletherester and hydrogenated furan.

In another aspect, the present invention provides a method of surface-treating a molded plastic article for vehicle interior materials. In particular, the method may be a fusion suede process, which may comprise steps of applying the adhesive composition to a molded plastic article and subsequently applying to the molded plastic article.

The fusion suede processing, as used herein, may be a process of dividing nylon-polyester partition yarn pile into several strands using air and an exclusive brush together after attaching pile closely to a powder coating machine. The fusion suede process may provide soft suede texture by spraying in a thin thread type through a brush process of a surface layer.

Preferably, the adhesive composition may be applied or spread in a thickness of about 30 to 40 μm on the molded plastic article. In particular, when the thickness of the adhesive composition is less than about 30 μm, adhesive performance may be decreased. When the thickness of the adhesive composition is greater than about 40 μm, an adhesive flows down and thus workability may be decreased.

Preferably, the pile may be a nylon/polyester partition yarn to reduce cost burden due to use of expensive fabric. In particular, the pile may provide conventional luxurious fabric texture such as suede used as luxurious fabric using a flocking manner with partition yarn pile composed of nylon and polyester.

In addition, the flocking manner may realize a variety of textures depending upon the type and thickness of pile. The pile may be largely divided into dyed yarn and partition yarn. For example, when partition yarn is composed of a mixture of polyester and nylon, division into a thin thread may be carried out. On the other hand, since dyed yarn is composed of a single material, division may not be impossible. Indeed, the partition yarn that may be divided into a thin thread may realize soft suede texture after processing.

In addition, the thickness of pile used in a flocking process as a vehicle interior material may be 3.0 D (about 0.8 mm), 1.5 D (about 0.6 mm), 0.8 D (about 0.4 mm), or the like. Rough and stiff texture becomes soft with decreasing thickness of the pile. However, storage and processing of thin pile may be difficult, and scratch resistance and wear resistance after flocking may be weak. Accordingly, it is preferable to use partition yarn having a thickness of 1.5 D (about 0.6 mm) as a proper pile thickness which may be easily processed according to an exemplary embodiment of the present invention.

Preferably, during the fusion suede process, a main material and a hardener may be mixed in a weight ratio of about 10:1 in the adhesive composition. Subsequently, viscosity may be about 120 to 250 seconds/F.C#4 at a temperature of about 20° C. by using a diluent such as deionized water. Exemplary fusion suede process may be carried out as follows.

Polypropylene, polycarbonate and a mixed acrylonitrile butadiene styrene resin are pre-treaded (IPA), and then painting may be performed in a thickness of about 8 to 12 μm using an aqueous primer. Subsequently, the adhesive composition may be painted in a thickness of about 30 to 40 μm after baking at a temperature of about 80° C. for 10 minutes. Subsequently, baking may be performed at a temperature of about 80° C. for about 30 minutes after painting nylon-polyester partition yarn pile in a wet state for one minute or less. Subsequently, baking may be performed as described above after treatment with an emulsifier, and processing may be carried out through a partitioning process and a remaining-pile removal process.

EXAMPLES

The following examples illustrate the invention and are not intended to limit the same.

Preparation Examples 1 to 3

In regard to Preparation Examples 1 to 3, ingredients were mixed in ratios summarized in Table 1 below to prepare water-dilutable polyurethane resins.

In particular, a method of Preparation Example 1 is as follows. A four-neck flask was equipped with a thermometer, a condenser, a stirrer and a heater, and then 2.25% by weight of dimethylpropionic acid was added to 20% by weight of N-methylpyrrolidone. Subsequently, temperature was elevated to 60° C. and melting was carried out for approximately one hour. Subsequently, 7% by weight of isophorone diisocyanate was added thereto and temperature was elevated to 80° C., followed by reacting while maintaining the temperature for one hour. Subsequently, polyester polyol was input. After two hours, a ratio (%) of NCO was measured and a ratio of 0.1% or less (since an error range upon measuring NCO % was 0.1%, 0.1% or less was determined as a standard) was an end point. After confirming NCO ratio (%), cooling was carried out. N-methyldiethanolamine as a neutralizing agent was added in an amount of 1.69% by weight at 70° C. or less, and stiffing and neutralization were carried out. Subsequently, reaction was terminated, thereby preparing a water-dilutable polyurethane resin.

TABLE 1

| Classification (% by weight) | Preparation example 1 | Preparation example 2 | Preparation example 3 |
|---|---|---|---|
| Isophorone diisocyanate | 6.89 | 5.80 | 11.53 |
| Dimethylpropionic acid (hydrophilic polyol) | 2.21 | 2.21 | 9.93 |

TABLE 1-continued

| Classification (% by weight) | Preparation example 1 | Preparation example 2 | Preparation example 3 |
|---|---|---|---|
| Polyester polyol | 69.57 | 80.66 | 61.77 |
| N-methylpyrrolidone (a solvent) | 19.67 | 9.67 | 14.56 |
| N-methyldiethanolamine (a neutralizing agent) | 1.66 | 1.66 | 2.21 |
| OH/NCO ratio | 0.6/1 | 0.5/1 | 0.5/1 |

As shown in Table 1, water-dilutable polyurethane resins were prepared in three ratios. In the cases of Preparation Examples 2 and 3, durability (light resistance) is weak due to a low OH/NCO ratio. In particular, in the case of Preparation Example 3, the contents of the dimethylpropanoic acid and isocyanate simultaneously increase and thus a hard portion relatively increases, thereby worsening texture.

Example 1 and Comparative Examples 1 and 2

In regard to Example 1 and Comparative Examples 1 and 2, constituents were prepared as disclosed below and mixed in ratios summarized in Table 2 below. Subsequently, painting was carried out through a fusion suede process and then molded articles were manufactured.

[Constituents]
Water-dilutable polyurethane resin having hydroxyl group: A water-dilutable polyurethane resin prepared according to Preparation Example 1 was used.
Waterborne polyurethane resin: A waterborne polyurethane resin including polyester polyol and isocyanate mixed in a weight ratio of 0.6:1 was used.
Waterborne acrylic resin: Waterborne acrylate
Hardener: Hydrophilic hexamethylene diisocyanate trimer
Extender pigment: Silica (SiO2)
Wetting agent: Polydimethyl siloxane
Slip agent: Polysiloxane polyether copolymer
Antifoaming agent: Polyoxyethylene fatty acid ester
Accelerator: Dibutyltin dilaurate
Light stabilizer: Mixture of UV absorbent and hindered amine light stabilizer (HALS)
Thickener: Polyurethane

TABLE 2

| Classification (% by weight) | Compositions | Example 1 | Comparative Example 1 | Comparative Example 2 |
|---|---|---|---|---|
| Resin | Water-dilutable polyurethane having hydroxyl group | 23.1 | 0.0 | 33.1 |
| | Waterborne polyurethane resin | 27.5 | 0.0 | 25.0 |
| | Waterborne acrylic resin | 0.0 | 50.6 | 0.0 |
| | Hardener | 7.5 | 7.5 | 7.5 |
| Pigment | Extender pigment | 6.5 | 6.5 | 6.5 |
| Solvent | Deionized water | 31.0 | 31.0 | 23.5 |
| Additives | Wetting agent | 0.7 | 0.7 | 0.7 |
| | Slip agent | 0.5 | 0.5 | 0.5 |
| | Antifoaming agent | 0.5 | 0.5 | 0.5 |
| | Accelerator | 0.3 | 0.3 | 0.3 |
| | Light stabilizer | 1.5 | 1.5 | 1.5 |
| | Thickener | 0.9 | 0.9 | 0.9 |

Example 2 and Comparative Examples 3 and 4

In regard to Example 2 and Comparative Examples 3 and 4, fusion suede processes were carried out under conditions summarized in Table 3 below, and molded plastic articles were surface-treated to suede texture.

TABLE 3

| Processing method | Classification |
|---|---|
| Suede fabric-enveloping processing | Comparative Example 3 |
| Fusion suede processing - dope dyed yarn [1.5D (0.6 mm)] | Comparative Example 4 |
| Fusion suede processing - partition yarn [1.5D (0.6 mm)] | Example 2 |

Test Example

In order to confirm properties and processability of molded articles manufactured according to Examples 1 and 2 and Comparative Examples 1 to 4, measurements were carried out using items of Tables 4 to 7 below as evaluation standards and results are summarized in Table 8 below.

[Evaluation Method]
(1) Surface wear evaluation method: JIS L 1084 as a color fastness tester was used. A rubber specimen of 20 mm×20 mm was covered with cotton canvas No. 6 (KS K 1450) and the covered rubber was worn out 1000 times under a load of 4.9 N (500 gf). Subsequently, surfaces were observed with the naked eye using surface wear grades.

(2) Friction fastness evaluation method: JIS L 1084 as a color fastness tester was used. A rubber specimen of 20 mm×20 mm was covered with cotton canvas No. 6 (KS K 1450) and the covered rubber was worn out 100 times under a load of 4.9 N (500 gf). Subsequently, surfaces were observed with the naked eye using friction fastness grades. Here, cotton canvas was wetted in DIW and evaluated in a wet state.

TABLE 4

| Texture | |
|---|---|
| Grade | Texture |
| 1 | Surface is very rough and stiff. |
| 2 | Surface is stiff. |
| 3 | Surface is soft. |

TABLE 4-continued

Texture

| Grade | Texture |
|---|---|
| 4 | Surface is very soft. |
| 5 | Surface is very soft and luxurious texture is exhibited. |

TABLE 5

Surface wear resistance

| Grade | Wear degree |
|---|---|
| 1 | Wear marks are observed and notably outstood. |
| 2 | Wear marks are observed and outstood. |
| 3 | Wear marks are clearly observed, but less outstood. |
| 4 | Wear marks are observed, but the amount there of is small, and wear mark is hardly outstood. |
| 5 | No wear mark is observed. |

TABLE 6

Scratch resistance

| Grade | Appearance |
|---|---|
| 1 | Surface damage is notably outstood. |
| 2 | Surface damage is observed. |
| 3 | Surface damage is observed, but not serious. |
| 4 | Surface damage is slightly observed. |
| 5 | No surface damage is observed. |

TABLE 7

Friction fastness

| Grade | Friction fastness |
|---|---|
| 1 | All pile is transferred to cotton cloth. |
| 2 | Pile is transferred to cotton cloth and wear marks are significant. |
| 3 | Pile is slightly transferred to cotton cloth and there are wear marks. |
| 4 | Pile is minutely transferred to cotton cloth, but there are almost no wear marks. |
| 5 | Pile is not transferred to cotton cloth and there are no wear marks. |

TABLE 8

| Classification | Type 1 | Type 2 | Type 3 | Type 4 | Type 5 |
|---|---|---|---|---|---|
| Composition | Example 1 | Comparative Example 1 | Comparative Example 2 | Example 1 | Example 1 |
| Processing method | Example 2 | Example 2 | Example 2 | Comparative Example 3 | Comparative Example 4 |
| Texture | 5 | 5 | 5 | 4 | 2 |
| Surface wear resistance | 4 | 4 | 1 | 1 | 4 |
| Scratch resistance | 5 | 1 | 3 | 4 | 5 |
| Friction fastness | 4 | 3 | 2 | 2 | 4 |

According to results of Table 8, it can be confirmed that, when the Types 2 to 5 were processed according to the processing methods of Example 2 and Comparative Examples 3 and 4 using the adhesive compositions of Comparative Examples 1 and 2, texture was not good or surface wear properties, scratch resistance and friction fastness were decreased. Particularly, it can be confirmed that, when the Type 4 was processed according to the processing method of Comparative Example 3 using the adhesive composition of Example 1, scratch resistance was enhanced, but surface wear resistance was not good.

On the contrary, it can be confirmed that, when the Type 1 was processed according to the processing method of Example 2 using the adhesive composition of Example 1, texture, surface wear resistance, scratch resistance and friction fastness were evenly enhanced.

Accordingly, it can be confirmed that, by using the adhesive composition of Example 1, smell and VOC generation from the organic solvent may be decreased, and properties such as elastic recoverability and scratch resistance may be enhanced while satisfying conventional properties.

In addition, it can be confirmed that, when a molded article was surface-treated using the highly elastic aqueous adhesive composition of Example 1 and the processing method, in which partition yarn pile was applied, of Example 2, production costs may be reduced and soft-touch suede texture that is eco-friendly and has superior elastic recoverability and scratch resistance may be obtained.

The adhesive composition according to various exemplary embodiments of the present invention may realize eco-friendliness by decreasing smell and VOC generation from the organic solvent and may enhance properties such as elastic recoverability and scratch resistance while satisfying conventional properties, by adding a water-dilutable polyurethane resin having a hydroxyl group to a waterborne polyurethane resin.

In addition, the present invention has confirmed that production costs may be decreased and suede texture, which is eco-friendly and has superior elastic recoverability and scratch resistance, having soft sense may be obtained, by surface-treating a molded article applying the aqueous adhesive composition and partition yarn pile.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An adhesive composition comprising:
   an amount of about 10 to 23.1% by weight of a water-dilutable polyurethane resin having a hydroxyl group;
   an amount of about 20 to 40% by weight of a waterborne polyurethane resin;
   an amount of about 5 to 20% by weight of a hardener;
   an amount of about 3 to 10% by weight of an extender pigment;
   an amount of about 0.1 to 5.0% by weight of a wetting agent;

an amount of about 0.1 to 3.0% by weight of a slip agent;
an amount of about 0.1 to 2.0% by weight of an antifoaming agent;
an amount of about 0.01 to 2.00% by weight of a hardening accelerator;
an amount of about 0.5 to 5.0% by weight of a light stabilizer;
an amount of about 0.1 to 3.0% by weight of a thickener; and
an amount of about 20 to 40% by weight of a solvent;
all the % by weight based on the total weight of the adhesive composition,
wherein the water-dilutable polyurethane resin having a hydroxyl group comprises: a) an amount of about 1 to 10% by weight of isocyanate having two or more functional groups on average; b) an amount of about 2.21 to 9.93% by weight of dimethylpropionic acid; c) an amount of about 55 to 80% by weight of polyester polyol; d) an amount of about 5 to 20% by weight of solvent and e) an amount of about 1 to 5% by weight of neutralizing agent, all the % by weight based on the total weight of the water-dilutable polyurethane resin having a hydroxyl group.

2. The adhesive composition according to claim 1, wherein the isocyanate having two or more functional groups on average is one or more selected from the group consisting of toluene diisocyanate, 4,4-diphenylmethane diisocyanate, hexamethylene diisocyanate, isophorone diisocyanate, dicyclohexylmethane diisocyanate and multi-functional isocyanate derived therefrom.

3. The adhesive composition according to claim 1, wherein a weight-average molecular weight (Mw) of the polyester polyol is of about 500 to 5000.

4. The adhesive composition according to claim 1, wherein the solvent is one or more selected from the group consisting of N-methylpyrrolidone, acetone, methylethylketone, dimethylformamide, glycoletherester and hydrogenated furan.

5. The adhesive composition according to claim 1, wherein the neutralizing agent is N-methyldiethanolamine, triethanolamine or a mixture thereof.

6. The adhesive composition according to claim 1, wherein the waterborne polyurethane resin comprises one or more polyols selected from the group consisting of polyacrylic polyol, polyester polyol and polycarbonate polyol.

7. The adhesive composition of claim 1, consisting essentially of:
an amount of about 10 to 23.1% by weight of a water-dilutable polyurethane resin having a hydroxyl group;
an amount of about 20 to 40% by weight of a waterborne polyurethane resin;
an amount of about 5 to 20% by weight of a hardener;
an amount of about 3 to 10% by weight of an extender pigment;
an amount of about 0.1 to 5.0% by weight of a wetting agent;
an amount of about 0.1 to 3.0% by weight of a slip agent;
an amount of about 0.1 to 2.0% by weight of an antifoaming agent;
an amount of about 0.01 to 2.00% by weight of a hardening accelerator;
an amount of about 0.5 to 5.0% by weight of a light stabilizer;
an amount of about 0.1 to 3.0% by weight of a thickener; and
an amount of about 20 to 40% by weight of a solvent;
all the % by weight based on the total weight of the adhesive composition.

8. The adhesive composition according to claim 7, wherein the water-dilutable polyurethane resin having a hydroxyl group consists essentially of: a) an amount of about 1 to 10% by weight of the isocyanate having two or more functional groups on average; b) an amount of about 1 to 10% by weight of the hydrophilic polyol having two or more functional groups on average; c) an amount of about 55 to 80% by weight of the polyester polyol; d) an amount of about 5 to 20% by weight of the solvent; and e) an amount of about 1 to 5% by weight of the neutralizing agent, all the % by weight based on the total weight of the water-dilutable polyurethane resin having a hydroxyl group.

9. The adhesive composition of claim 1, consisting of:
an amount of about 10 to 23.1% by weight of a water-dilutable polyurethane resin having a hydroxyl group;
an amount of about 20 to 40% by weight of a waterborne polyurethane resin;
an amount of about 5 to 20% by weight of a hardener;
an amount of about 3 to 10% by weight of an extender pigment;
an amount of about 0.1 to 5.0% by weight of a wetting agent;
an amount of about 0.1 to 3.0% by weight of a slip agent;
an amount of about 0.1 to 2.0% by weight of an antifoaming agent;
an amount of about 0.01 to 2.00% by weight of a hardening accelerator;
an amount of about 0.5 to 5.0% by weight of a light stabilizer;
an amount of about 0.1 to 3.0% by weight of a thickener; and
an amount of about 20 to 40% by weight of a solvent;
all the % by weight based on the total weight of the adhesive composition.

10. A method of surface-treating a molded plastic article for vehicle interior materials, the method comprising:
applying an adhesive composition of claim 1 to the molded plastic article; and
applying a pile on the molded plastic article.

11. The method according to claim 10, wherein the adhesive composition is spread in a thickness of about 30 to 40 μm.

12. The method according to claim 10, wherein the pile is a nylon/polyester partition yarn.

* * * * *